(12) United States Patent
Lu et al.

(10) Patent No.: US 8,756,783 B2
(45) Date of Patent: Jun. 24, 2014

(54) METHOD OF FULLY, AUTOMATICALLY REMOVING A POLARIZER OF AN LCD PANEL

(75) Inventors: Jia-Sheng Lu, Shenzhen (CN); De-Sheng Yin, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 248 days.

(21) Appl. No.: 13/380,860

(22) PCT Filed: Dec. 9, 2011

(86) PCT No.: PCT/CN2011/083728
§ 371 (c)(1),
(2), (4) Date: Dec. 26, 2011

(87) PCT Pub. No.: WO2013/078730
PCT Pub. Date: Jun. 6, 2013

(65) Prior Publication Data
US 2013/0133178 A1 May 30, 2013

(30) Foreign Application Priority Data
Nov. 29, 2011 (CN) .......................... 2011 1 0387524

(51) Int. Cl.
*B23P 19/00* (2006.01)

(52) U.S. Cl.
USPC ........ 29/426.1; 29/426.3; 29/426.5; 156/247; 156/254; 156/714

(58) Field of Classification Search
USPC .................. 29/426.1, 426.3, 426.5, 762, 764; 156/64, 247, 254, 350, 714, 718, 763, 156/938
See application file for complete search history.

(56) References Cited

U.S. PATENT DOCUMENTS 6,227,276 B1 * 5/2001 Kim et al. ...................... 156/763
8,259,263 B2 * 9/2012 Kimura et al. .................. 349/96

* cited by examiner

*Primary Examiner* — Thiem Phan
(74) *Attorney, Agent, or Firm* — Cheng-Ju Chiang (57) ABSTRACT

An automatic corner lift-off apparatus for a polarizer of a liquid crystal display (LCD) panel is disclosed, which is suitable for use in a process of removing a polarizer during manufacturing of an LCD panel and comprises: a front clip, comprising a long arm and a short arm which intersect with each other to substantially form an "L" shape; a back clip, spaced apart from the front clip and being capable of cooperating with the front clip to perform a clipping action; and at least one sensor disposed on the front clip or the back clip, being configured to sense whether the polarizer has been successfully lifted off. Thereby, the present disclosure allows for fully automatic polarizer removing operations and can reduce work-related injuries and improve the success ratio of and efficiency of removing the polarizer.

5 Claims, 9 Drawing Sheets

METHOD OF FULLY, AUTOMATICALLY REMOVING A POLARIZER OF AN LCD PANEL

FIELD OF THE INVENTION

The present disclosure generally relates to the technical field of liquid crystal displaying, and more particularly, to an apparatus and a method for removing a polarizer in a manufacturing process of a liquid crystal display (LCD) panel.

BACKGROUND OF THE INVENTION

The polarizer is known as an important integral part of a thin film transistor liquid crystal display (TFT-LCD), and the attachment process of attaching the polarizer onto the TFT-LCD is essential for performance of the LCD product. In practice, improper attachment may arise during the process of attaching the polarizer. If it is desired to re-attach the polarizer, the polarizer that is improperly attached must be removed from the surface of the LCD panel. Currently, there are two ways of removing the polarizer: fully manual removal and semi-automatic removal. The fully manual removal takes a long time and has a high risk of damaging or scratching the polarizer, which is particularly the case for large-size LCD panels. When the semi-automatic removal is adopted, a corner of the polarizer must be lifted off manually and then an automatic instrument with a roller is used to remove the polarizer. Because the corner of the polarizer is lifted off manually, whether the corner can be lifted off in a desirable way is directly related to the success ratio and it is difficult to accomplish this accurately in a manual way; and furthermore, because the operator(s) must reach into the equipment to complete this operation, there exist safety-related risks.

SUMMARY OF THE INVENTION

The primary objective of the present disclosure is to provide an automatic removing machine, an automatic corner lift-off apparatus and an automatic removing method for a polarizer of an LCD panel, which allow for fully automatic polarizer removing operations and can reduce work-related injuries and improve the success ratio of and efficiency of removing the polarizer.

To achieve the aforesaid objective, the present disclosure provides an automatic corner lift-off apparatus for use in a process of removing a polarizer during manufacturing of an LCD panel, and the automatic corner lift-off apparatus comprises a front clip, a back clip and at least one sensor. The front clip comprises a long arm and a short arm which intersect with each other to substantially form an "L" shape; the back clip is spaced apart from the front clip and is capable of cooperating with the front clip to perform a clipping action; and the sensor is disposed on the front clip or the back clip and is configured to sense whether the polarizer has been successfully lifted off.

To achieve the aforesaid objective, the present disclosure further provides an automatic removing machine for a polarizer of an LCD panel. The automatic removing machine comprises: an automatic corner lift-off apparatus, comprising a front clip, a back clip and at least one sensor, wherein the front clip comprises a long arm and a short arm which intersect with each other to substantially form an "L" shape; the back clip is spaced apart from the front clip and is capable of cooperating with the front clip to perform a clipping action; and the sensor is disposed on the front clip or the back clip and is configured to sense whether the polarizer has been successfully lifted off; a removing platform for supporting the LCD panel from which the polarizer is to be removed; and a front removing roller and a back removing roller. When the polarizer is to be removed, the automatic corner lift-off apparatus accomplishes a corner lift-off operation automatically and clips the polarizer of which a corner has been lifted off, and the front removing roller and the back removing roller move in reverse directions, and meanwhile, the automatic corner lift-off apparatus moves upwards and forwards in coordination with a removing speed and the removing platform also moves forward to accomplish a complete removing operation on the polarizer.

To achieve the aforesaid objective, the present disclosure further provides a method of fully automatically removing a polarizer of an LCD panel, which comprising the following steps of: placing the LCD panel on a removing platform; locating the LCD panel on the removing platform; automatically lifting off a corner of the polarizer from the LCD panel; and automatically removing the polarizer from the LCD panel after the corner of the polarizer is automatically lifted off from the LCD panel.

The present disclosure has the following benefits: by virtue of precise coordination of two included angles and by using a sensor to automatically monitor a lift-off status of the polarizer, automatic corner lift-off operations can be achieved. This further allows for fully automatic polarizer removing operations. Thereby, the risks of work-related injuries can be reduced, and the ratio of successfully removing polarizers, the re-utilization rate of LCD panels and the efficiency of removing the polarizers can be improved.

BRIEF DESCRIPTION OF THE DRAWINGS

In order to more clearly describe the technical solutions of the embodiments of the present disclosure, attached drawings to be used in the detailed description of the disclosure will be briefly described hereinbelow. Obviously, the attached drawings described hereinbelow only illustrate some of the embodiments of the present disclosure, and those of ordinary skill in the art can also obtain other attached drawings therefrom without the need of making inventive efforts, wherein.

DETAILED DESCRIPTION OF THE INVENTION

Various embodiments of the disclosure are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

In order to further describe the technical solutions adopted to achieve the objectives of the present disclosure and the efficacies thereof, implementations, methods, steps, structures, features and efficacies of the color flat display panel and the corresponding color flat display device according to the present disclosure will be detailed hereinbelow with reference to the attached drawings and preferred embodiments thereof. The aforesaid and other technical disclosures, features and efficacies of the present disclosure will become apparent from the following detailed description of the preferred embodiments that is made with reference to the attached drawings. The technical solutions and the efficacies thereof will be better understood by those of ordinary skill in the art upon reviewing the following description. However, the attached drawings are only provided for illustration purpose but not to limit the present disclosure.

Figure 1:
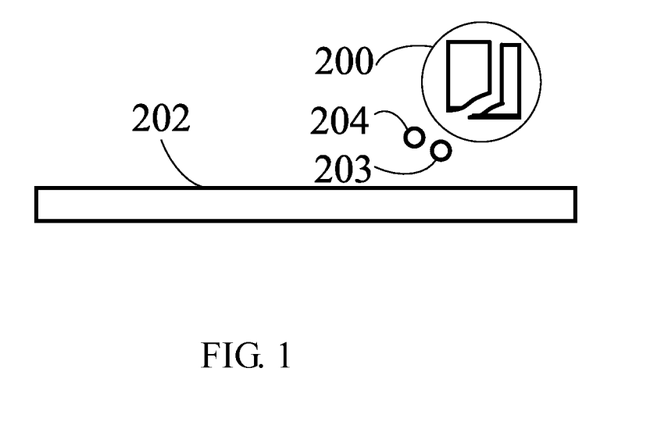
FIG. 1 is a schematic structural view of an embodiment of an automatic removing machine for a polarizer of an LCD panel according to the present disclosure.

Referring to FIG. 1, there is shown a schematic structural view of an embodiment of an automatic removing machine for a polarizer of an LCD panel according to the present disclosure. The automatic removing machine comprises an automatic corner lift-off apparatus 200, a removing platform 202, a front removing roller 203 and a back removing roller 204. The removing platform 202 is used for supporting a given LCD panel from which a polarizer is to be removed.

Figure 2:
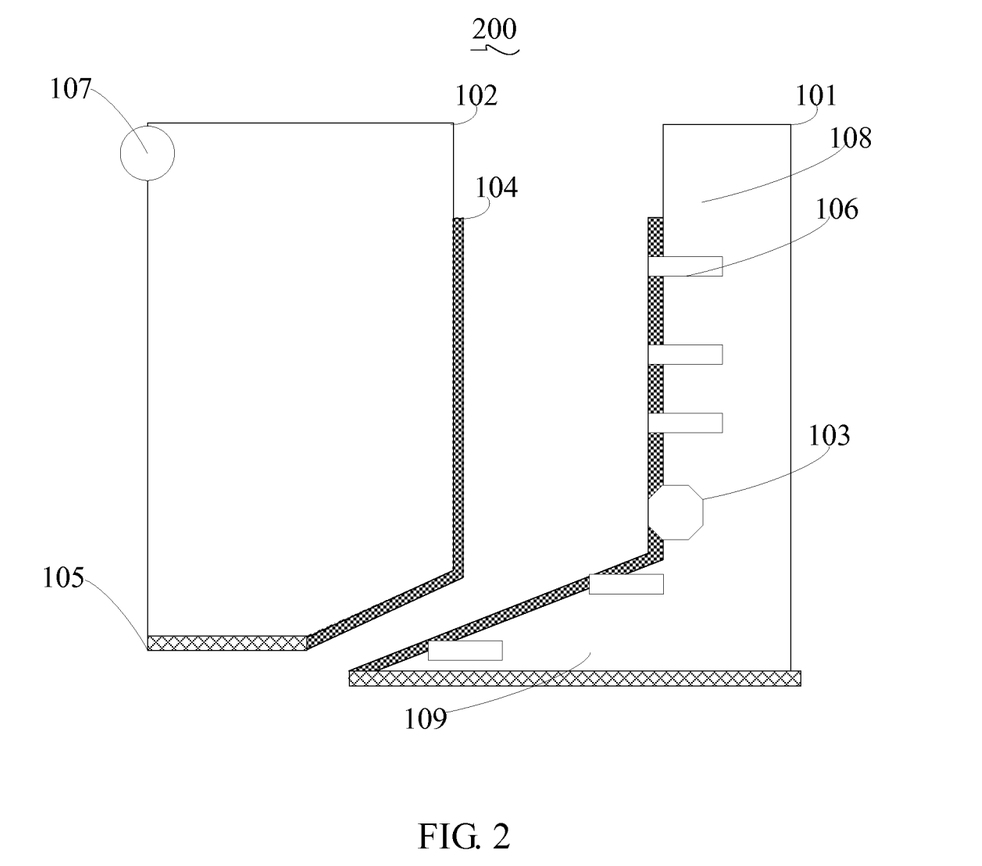
FIG. 2 is a schematic structural view of an embodiment of an automatic corner lift-off apparatus according to the present disclosure.

Referring to FIG. 2 together, the automatic corner lift-off apparatus 200 comprises a front clip 101, a back clip 102, and at least one sensor 103 disposed on the front clip or the back clip. The back clip 102 is spaced apart from the front clip 101 and is capable of cooperating with the front clip 101 to perform a clipping action.

The front clip 101 is formed by a long arm 108 and a short arm 109 connected together, and the long arm 108 and the short arm 109 intersect with each other to substantially form an "L" shape. The short arm 108 is of a wedge shape with a sharp point of the wedge shape (not labeled) being disposed near the back clip 102. The back clip 102 is formed with a chamfer (not labeled) at a corner thereof that is located near the sharp point of the wedge shape of the short arm 109, and a plane of the chamfer is spaced apart from and parallel to a plane of a bevel edge of the sharp point of the wedge shape so that damages to the polarizer due to a non-uniform force applied on the polarizer can be avoided when the polarizer of the LCD panel is clipped.

The front clip 101 is able to move upwards and downwards separately. Alternatively, the front clip 101 and the back clip 102 are able to move upwards and downwards simultaneously and move in a left-and-right direction simultaneously. When the front clip 101 lifts off the corner of the polarizer (referring to FIG. 11 to FIG. 18), the back clip 102 cooperates with the front clip 101 to clip the polarizer tightly to accomplish the corner lift-off operation together.

Referring further to FIG. 2, the at least one sensor 103 is disposed on the front clip 101 at an intersection between the long arm 108 and the short arm 109 and near the back clip. The at least one sensor 103 is configured to determine a distance between the front clip 101 and the polarizer to decide a magnitude of a force applied by the front clip 101, and to sense whether the polarizer has been successfully lifted off. Alternatively, the at least one sensor 103 may be disposed on a side edge of the chamfer and near the intersection between the short arm 109 and the long arm 108, disposed at other positions on the front clip 101 or the back clip 102, or disposed separately from the front clip 101 and the back clip 102. Of course, in order to guarantee the spatial range of the measurement, a plurality of sensors may also be disposed at the aforesaid positions respectively.

Furthermore, anti-sticking layers 104 are disposed on opposite surfaces of the front clip 101 and the back clip 102 respectively to prevent adhesion of the polarizer onto the front clip 101 or the back clip 102. The anti-sticking layers 104 are made of flexible materials to prevent damages to the polarizer or the LCD panel. A buffer layer 105 is disposed at a bottom of the front clip 101 and a bottom of the back clip 102 respectively to press against the LCD panel when a corner is lifted off. The bottom of the front clip 101 and the bottom of the back clip 102 are horizontal and smooth, and the buffer layer 105 is made of a flexible material to prevent damage to the LCD panel. Air-flow apertures 106 are disposed on one of an inner side of the front clip 101 and an inner side of the back clip 102 that are adjacent to each other so that a high-pressure air flow is blown out to prevent adhesion of the polarizer onto the front clip or the back clip. It is preferred that the flow rate of the high-pressure air flow through the air-flow apertures 106 is just adequate to blow off the polarizer.

A charge-coupled device (CCD) 107 is disposed on the front clip 101 or the back clip 102 to capture an image of a corner of the LCD panel from which the polarizer is to be removed and to calculate a position of the corner of the LCD panel. Of course, the CCD 107 may also be disposed separately from the front clip 101 and the back clip 102.

When the polarizer (not labeled) is to be removed, the LCD panel is disposed on the removing platform 202. Then the automatic corner lift-off apparatus 200 accomplishes a corner lift-off operation automatically and clips the polarizer of which a corner has been lifted off, and the front removing roller 203 and the back removing roller 204 move in reverse directions. Meanwhile, the automatic corner lift-off apparatus 200 moves upwards and forwards in coordination with a removing speed and the removing platform 202 also moves forward to accomplish a complete removing operation on the polarizer.

Figure 3:
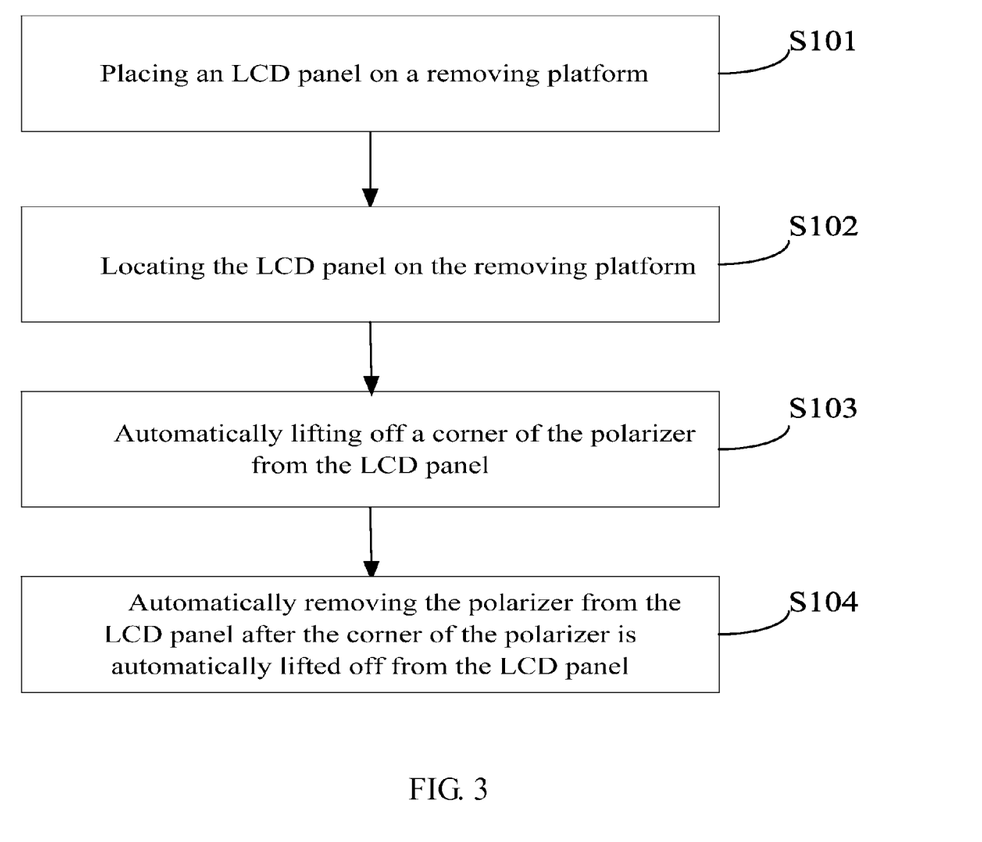
FIG. 3 is a flowchart diagram illustrating a process of using the automatic removing machine shown in FIG. 1 to fully automatically remove a polarizer of an LCD panel according to the present disclosure.

As shown in FIG. 3, there is shown a flowchart diagram of an embodiment of a method for fully automatically removing a polarizer of an LCD panel. The method comprises the following steps.

Step S101: placing an LCD panel on a platform.

When the process begins, the LCD panel is conveyed to a font end of a removing platform and is arranged in the same direction in which the LCD panel is originally arranged before being loaded.

Step S102: locating the LCD panel on the platform.

Figure 4:
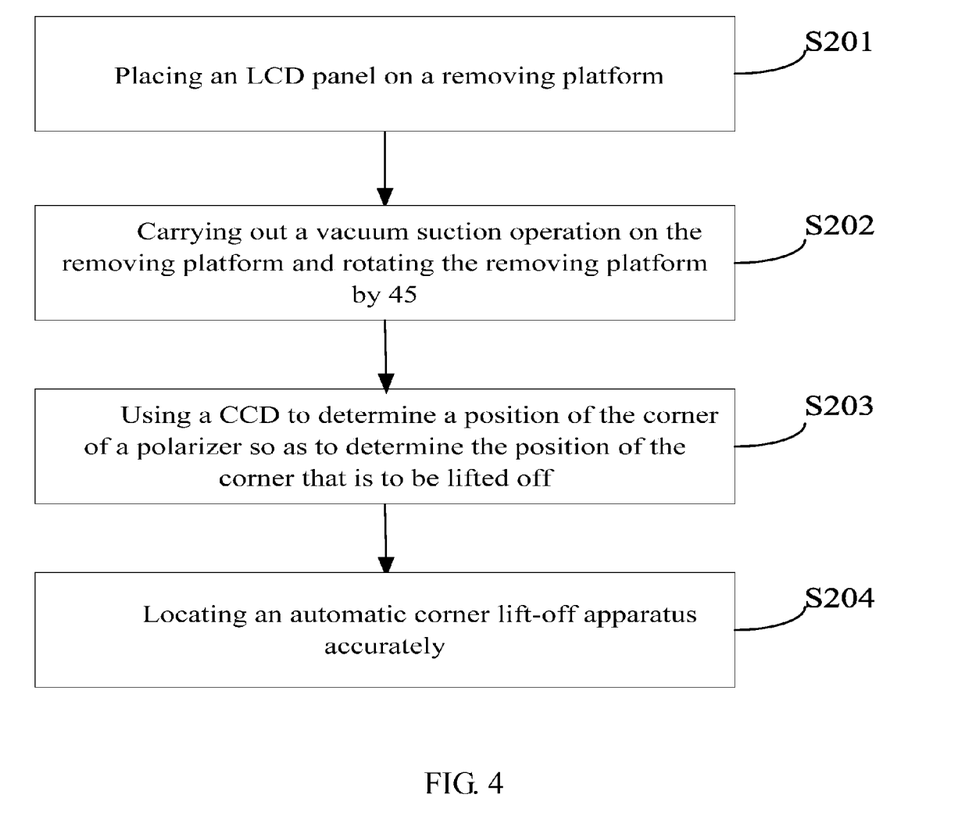
FIG. 4 is a flowchart diagram of detailed operations in a step S102 in FIG. 3.

Referring to FIG. 4 together, there is shown a flowchart diagram illustrating how to locate the LCD panel in the process of removing the polarizer of the LCD panel.

Step S201: placing the LCD panel on a removing platform.

Figure 7:
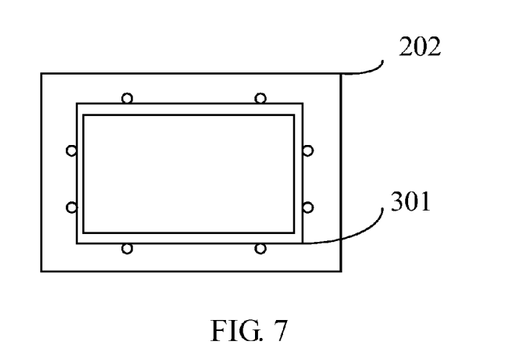
FIG. 7 is a schematic structural view of the LCD panel according to the present disclosure when being disposed on a removing platform.

Referring to FIG. 7 together, in the step of placing the LCD panel 301 on the removing platform 202, alignment marks on the LCD panel 301 are used to determine the position of the LCD panel 301 on the removing platform 202 so as to align the LCD panel 301.

Step S202: carrying out a vacuum suction operation on the removing platform and rotating the removing platform by 45°.

Figure 8:
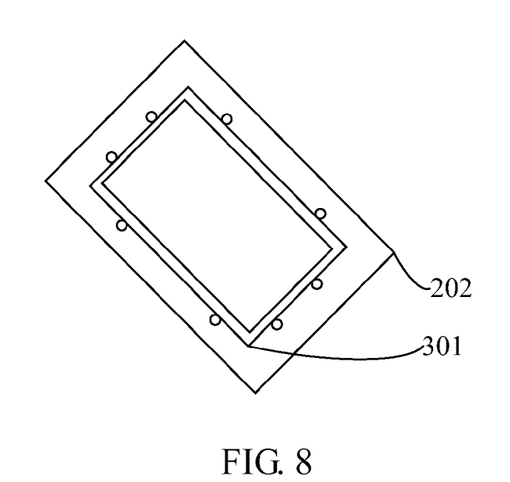
FIG. 8 is a schematic structural view illustrating how to carry out a vacuum suction operation on the removing platform according to the present disclosure.

Referring to FIG. 8 together, after the LCD panel 301 is placed on the removing platform 202, the LCD panel 301 is adsorbed on the removing platform 202 tightly by use of a vacuum suction apparatus. After the vacuum suction operation is completed, the LCD panel 301 and the removing platform 202 are rotated together by 45° in a clockwise direction or an anticlockwise direction.

Step S203: using a CCD to determine a position of the corner of the polarizer so as to determine the position of the corner that is to be lifted off.

Figure 9:
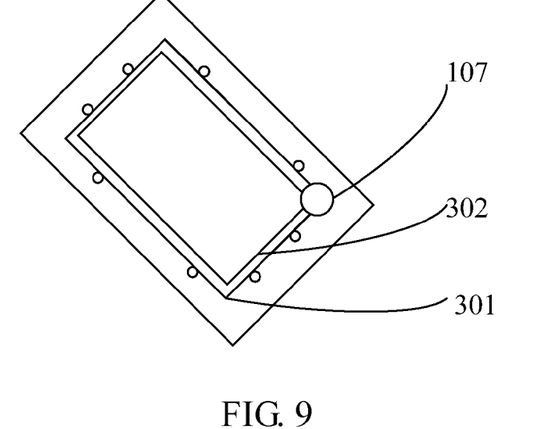
FIG. 9 is a schematic structural view illustrating how to determine a position of a corner of the polarizer by use of a CCD according to the present disclosure.

Referring to FIG. 9 together, the CCD 107 is used to determine the position of the corner of the polarizer 302 that has to be removed from the LCD panel 301 so as to determine the position of the corner that is to be lifted off. After the position of the corner that is to be lifted off is determined, accurate coordinates information of the corner that is to be lifted off is obtained through image capturing and accurate calculation in the computer.

Step S204: locating an automatic corner lift-off apparatus accurately.

Figure 10:
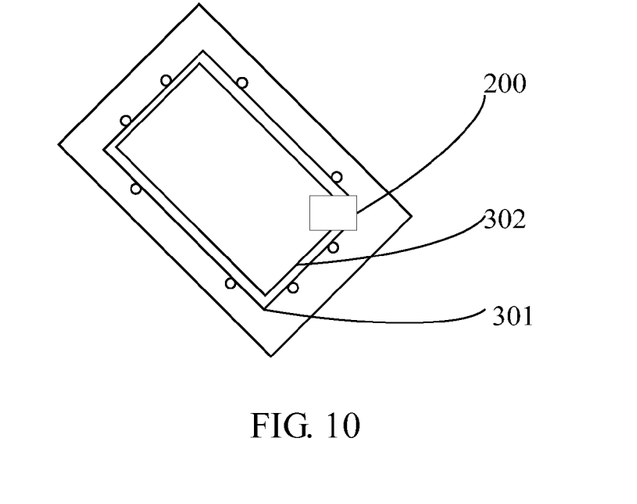
FIG. 10 is a schematic structural view illustrating how to locate the automatic corner lift-off apparatus accurately according to the present disclosure.

Referring to FIG. 10 together, after the accurate coordinate information of the polarizer 302 of the LCD panel 301 is obtained, the automatic corner lift-off apparatus (not labeled) is moved so as to be located.

Step S103: automatically lifting off a corner of the polarizer from the LCD panel.

Figure 5:
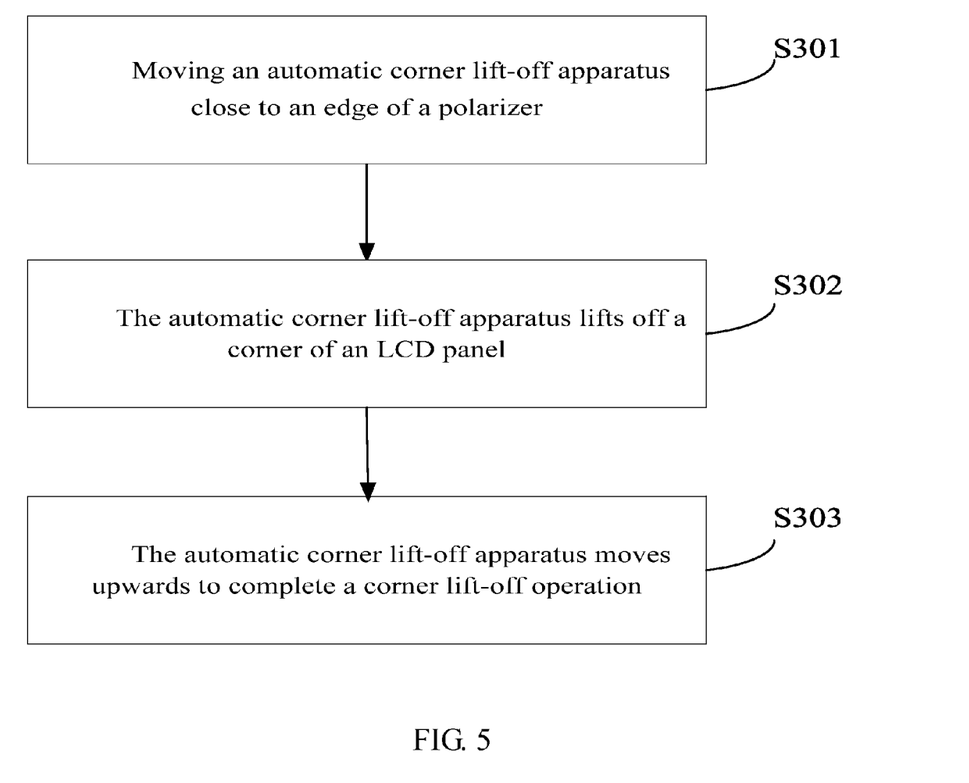
FIG. 5 is a flowchart diagram of detailed operations in a step S103 in FIG. 3.

Referring to FIG. 5 together, a flowchart diagram illustrating how the corner of the polarizer is lifted off from the LCD panel in the process of removing the polarizer from the LCD panel is shown therein.

Step S301: moving the automatic corner lift-off apparatus close to an edge of the polarizer.

Figure 11:
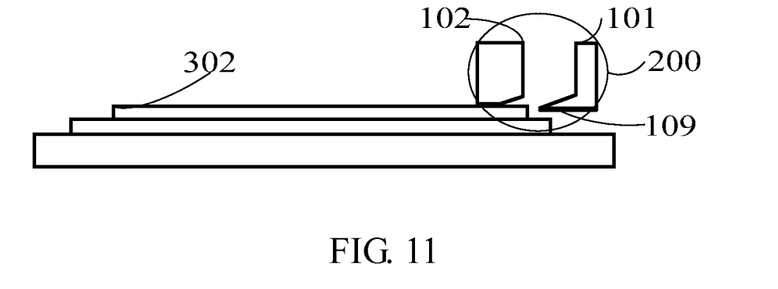
FIG. 11 is a schematic structural view illustrating that the automatic corner lift-off apparatus moves close to an edge of the polarizer after being located according to the present disclosure.
Figure 12:
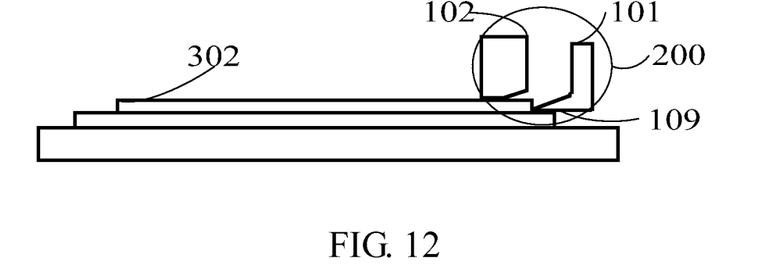
FIG. 12 is a schematic structural view illustrating that the automatic corner lift-off apparatus is located near the edge of the polarizer according to the present disclosure.

Referring to FIG. 11 and FIG. 12 together, after the automatic corner lift-off apparatus 200 has been located accurately, the back clip 102 of the automatic corner lift-off apparatus 200 is fixed with respect to the polarizer 302, and the front clip 101 is moved until the sharp point of the wedge-shaped short arm 109 thereof come into contact with the corner of the polarizer 302 that has to be removed.

Step S302: the automatic corner lift-off apparatus lifts off a corner of the LCD panel.

Figure 13:
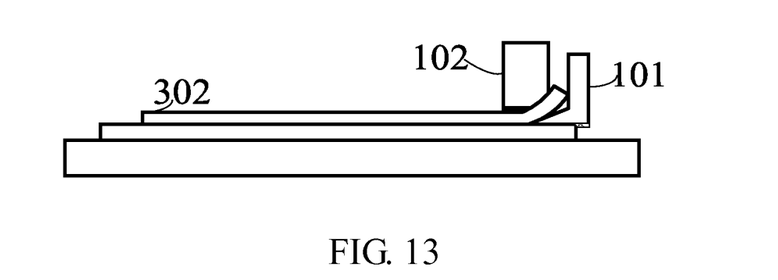
FIG. 13 is a schematic structural view illustrating that the automatic corner lift-off apparatus lifts off the corner of the polarizer of the LCD panel according to the present disclosure.

Referring to FIG. 13 together, the front clip 101 is further moved towards the back clip 102 to cooperate with the back clip 102 to carry out a corner lift-off operation on the polarizer 302.

Step S303: the automatic corner lift-off apparatus moves upwards to complete a corner lift-off operation.

Figure 14:
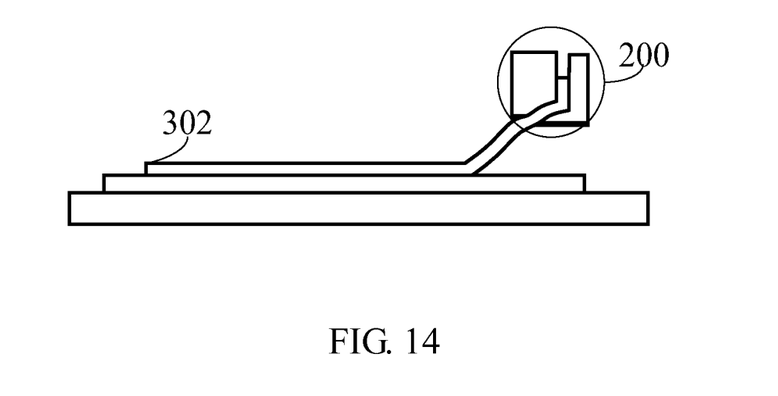
FIG. 14 is a schematic structural view illustrating that the automatic corner lift-off apparatus moves upwards to complete the corner lift-off operation according to the present disclosure.

Referring to FIG. 14 together, after the corner of the polarizer 302 has been lifted off, the automatic corner lift-off apparatus 200 moves upwards to complete the corner lift-off operation on the polarizer 302.

Step S104: after the corner of the polarizer has been automatically lifted off from the LCD panel, the polarizer is automatically removed from the LCD panel.

Figure 6:
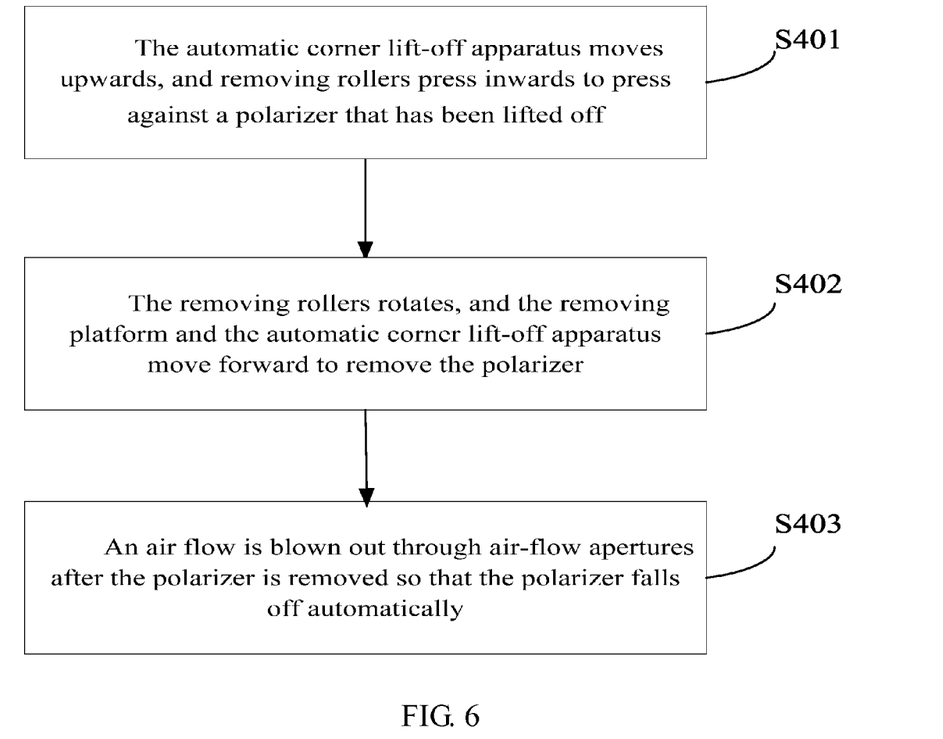
FIG. 6 is a flowchart diagram of detailed operations in a step S104 in FIG. 3.

Referring to FIG. 6 together, a flowchart diagram illustrating how to remove the polarizer automatically in the process of removing the polarizer from the LCD panel is shown therein.

Step S401: the automatic corner lift-off apparatus moves upwards, and removing rollers press inwards to press against the polarizer that has been lifted off.

Figure 15:
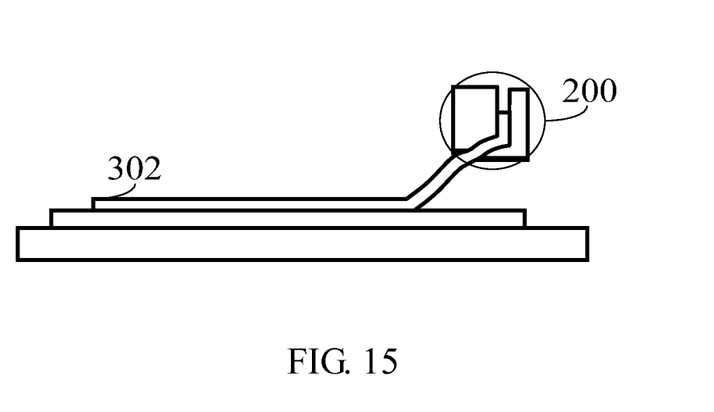
FIG. 15 is a schematic structural view illustrating that the automatic corner lift-off apparatus moves upwards according to the present disclosure.
Figure 16:
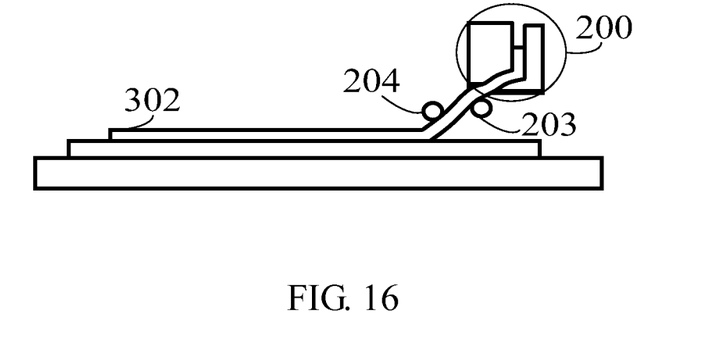
FIG. 16 is a schematic structural view illustrating that removing rollers press inwards to press against the polarizer of which the corner has been lifted off according to the present disclosure.

Referring to FIG. 15 and FIG. 16 together, after the automatic corner lift-off apparatus 200 has accomplished the corner lift-off operation on the polarizer 302, the front removing roller 203 and the back removing roller 204 are moved so that the polarizer 302 is located between the front removing roller 203 and the back removing roller 204. When the automatic corner lift-off apparatus 200 moves forwards, the front removing roller 203 and the back removing roller 204 press against the polarizer 302 that has been lifted off. The front removing roller 203 and the back removing roller 204 are formed with flexible materials thereon which can prevent damages to the polarizer 302.

Step S402: the removing rollers rotate, and the removing platform and the automatic corner lift-off apparatus move forward to remove the polarizer.

Figure 17:
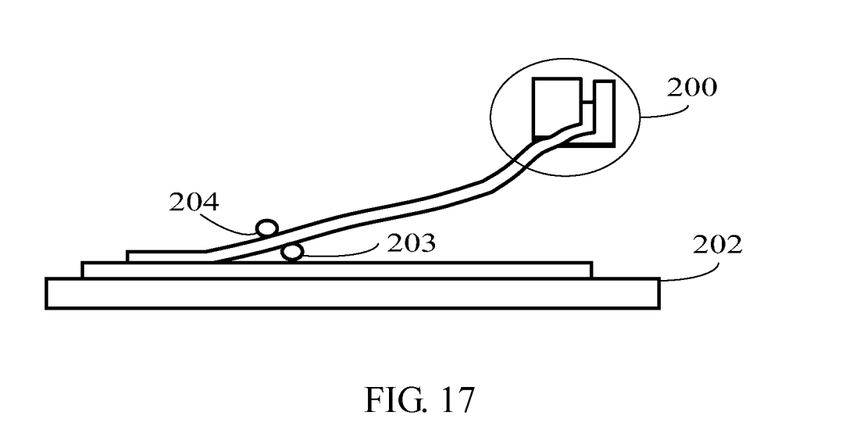
FIG. 17 is a schematic structural view illustrating that the removing rollers rotate and the removing platform moves forwards according to the present disclosure.

Referring to FIG. 17 together, the front removing roller 203 and the back removing roller 204 rotate reciprocally. Rotation of the removing rollers in reverse directions may be achieved in the following ways: the front removing roller 203 is used as a driving roller and the back removing roller 204 is used as a driven roller; or the front removing roller 203 is used as a driven roller and the back removing roller 204 is used as a driving roller; or alternatively, both the front removing roller 203 and the back removing roller 204 are used as driving rollers. The automatic corner lift-off apparatus 200 moves in coordination with the removing platform 202 to remove the polarizer.

Step S403: after the polarizer is removed, an air flow is blown out through air-flow apertures so that the polarizer falls off automatically.

Figure 18:
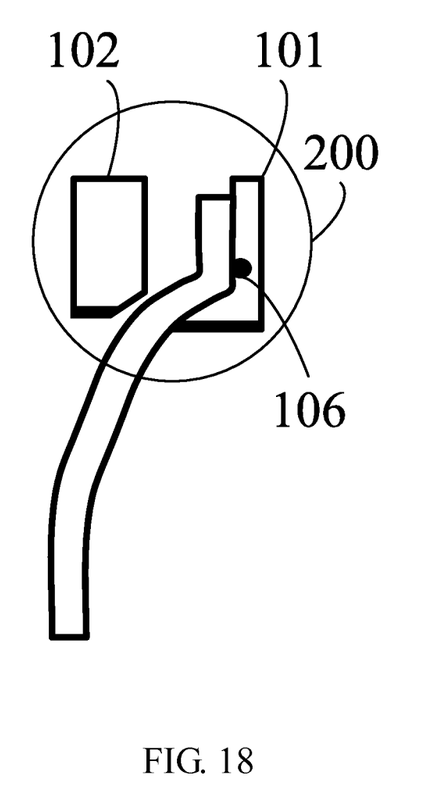
FIG. 18 is a schematic structural view illustrating that an air flow is blown out through air-flow apertures and the polarizer falls off automatically according to the present disclosure.

Referring to FIG. 18 together, after the polarizer 302 is removed completely, the front clip 101 and the back clip 102 of the automatic corner lift-off apparatus 200 open and an air flow is blown out through the air-flow apertures 106 to blow off the polarizer that might be adhered onto the front clip 101 or the back clip 102 so that the polarizer 302 falls off automatically.

By virtue of precise coordination of two included angles and by using a sensor to automatically monitor a lift-off status of the polarizer, automatic corner lift-off operations can be achieved. Furthermore, a CCD is used to determine the position of the corner of the polarizer that has to be removed from the LCD panel so as to determine the position of the corner that is to be lifted off. After the position of the corner that is to be lifted off is determined, accurate coordinate information of the corner that is to be lifted off is obtained through image capturing and accurate calculation in the computer. This allows for fully automatic polarizer removing operations. Thereby, the risks of work-related injuries can be reduced, and the ratio of successfully removing polarizers, the re-utilization rate of LCD panels and the efficiency of removing the polarizers can be improved.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method of fully automatically removing a polarizer of an LCD (liquid crystal display) panel, comprising the following steps of:
    placing the LCD panel on a removing platform;
    locating the LCD panel on the removing platform, the LCD panel being aligned on the removing platform, and a vacuum suction operation being carried out on the removing platform and the removing platform is rotated by 45°;
    automatically lifting off a corner of the polarizer from the LCD panel performed by an automatic corner lift-off apparatus; and
    automatically removing the polarizer from the LCD panel by using two removing rollers after the corner of the polarizer is automatically lifted off from the LCD panel;
    wherein the automatic corner lift-off apparatus comprises:
    a front clip, comprising a long arm and a short arm which intersect with each other to substantially form an "L" shape;
    a back clip, spaced apart from the front clip and being capable of cooperating with the front clip to perform a clipping action; and
    at least one sensor disposed on the front clip or the back clip, being configured to sense whether the polarizer has been successfully lifted off.

2. The method of claim 1, wherein in the step of locating the LCD panel on the removing platform, a position of the corner of the polarizer is determined by use of a charge-coupled device (CCD) and through image processing in a computer so as to determine the position of the corner that is to be lifted off.

3. The method of claim 1, wherein after the automatic corner lift-off apparatus has accomplished the corner lift-off operation automatically, the automatic corner lift-off apparatus clips the polarizer of which the corner has been lifted off, and the removing rollers move in reverse directions, and meanwhile, the automatic corner lift-off apparatus moves upwards and forwards in coordination with a removing speed and the removing platform also moves forward to accomplish a complete removing operation on the polarizer.

4. The method of claim 3, wherein rotation of the removing rollers in reverse directions is achieved by having both the removing rollers rotate or by using one of the removing rollers as a driving roller and the other as a driven roller.

5. The method of claim 4, wherein after the polarizer is removed completely, the front clip and the back clip of the automatic corner lift-off apparatus open and an air flow is blown out through air-flow apertures to blow off the polarizer that might be adhered onto the front clip or the back clip so that the polarizer falls off automatically.

* * * * *